US007891664B2

(12) United States Patent
White et al.

(10) Patent No.: US 7,891,664 B2
(45) Date of Patent: Feb. 22, 2011

(54) GAMING MACHINE WITH A FEEDBACK CONTROL LOOP TO ENSURE RANDOM SELECTIONS BY USING A COUNTERVAILING BIAS

(75) Inventors: Michael L. White, Northbrook, IL (US); Michael P. Casey, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1408 days.

(21) Appl. No.: 10/840,856

(22) Filed: May 7, 2004

(65) Prior Publication Data

US 2005/0250581 A1 Nov. 10, 2005

(51) Int. Cl.
*A63F 13/00* (2006.01)

(52) U.S. Cl. ...................................... 273/138.3; 463/21

(58) Field of Classification Search ............. 463/20–25; 708/250; 273/138.3
See application file for complete search history.

(56) References Cited

U.S. PATENT DOCUMENTS 5,016,879 A 5/1991 Parker et al. ............ 273/126 A
5,788,230 A 8/1998 Krise et al. ............. 273/121 B
5,830,064 A * 11/1998 Bradish et al. ................ 463/22
5,938,196 A * 8/1999 Antoja .................... 273/143 C
6,047,963 A 4/2000 Pierce et al. ............ 273/121 B
6,419,225 B2 7/2002 Sines et al. ............. 273/121 B
6,589,115 B2 7/2003 Walker et al. ................. 463/25
6,666,766 B2 12/2003 Baerlocher et al. ............ 463/16
6,669,195 B1 12/2003 Gordon .................. 273/121 B
6,698,761 B1 3/2004 Clague ....................... 273/443
6,921,337 B1 * 7/2005 Kennedy et al. .............. 463/42
2002/0013170 A1 1/2002 Miller et al. .................. 463/19
2003/0130029 A1 * 7/2003 Crumby ....................... 463/20
2003/0200239 A1 * 10/2003 Hars .......................... 708/250
2004/0002373 A1 1/2004 Kaminkow .................. 463/20
2004/0018879 A1 1/2004 Borg .......................... 463/46
2004/0029641 A1 2/2004 Borg .......................... 463/46
2004/0056422 A1 3/2004 Clague ....................... 273/443
2005/0054418 A1 * 3/2005 Baerlocher .................. 463/20

* cited by examiner

*Primary Examiner*—John M Hotaling, II
(74) *Attorney, Agent, or Firm*—Schwegman, Lundberg & Woessner, P.A.

(57) ABSTRACT

The invention relates generally to wagering games and, more particularly, to a gaming machine which determines game outcomes with a mechanical selector mechanism. Wagering games with game outcomes produced by a mechanical mechanism have not been widely accepted. Mechanical gaming machines are susceptible to bias from both inherent manufacturing defects and wear related degradation. Because gaming machines must meet regulatory required payback percentages, deviation from random operation may jeopardize the gaming machine's license. To overcome bias that may cause operation of the gaming machine outside its regulatory approved technical specifications, a feedback control loop can be implemented in the gaming machine to detect and correct bias as it occurs.

26 Claims, 10 Drawing Sheets

GAMING MACHINE WITH A FEEDBACK CONTROL LOOP TO ENSURE RANDOM SELECTIONS BY USING A COUNTERVAILING BIAS

FIELD OF THE INVENTION

The present invention relates generally to gaming machines and, more particularly, to a method and apparatus for ensuring that a wagering device that uses a mechanical mechanism to at least partially determine game outcomes, produces game outcomes that conform to a required game outcome probability distribution.

BACKGROUND OF THE INVENTION

Gaming machines, such as slot machines, video poker machines and the like, have been a cornerstone of the gaming industry for years. Generally, the popularity of such machines with players is dependent on the likelihood (or perceived likelihood) of winning money at the machine and the intrinsic entertainment value of the machine. Part of the perceived likelihood of winning money at a gaming machine depends on the player's perception of the machine's fairness.

For example, many players only trust electromechanical type slot machines and refuse to play the electronic video slot games, fearing that these games might not be trustworthy—despite strict government regulation. In contrast, video gaming machines provide an electronic video display of the game outcome that presents an artificial appearance and does not evoke the same player trust as a gaming machine with mechanical components. Yet, even these electromechanical slot-type games are controlled by an electronic microprocessor that predetermines the game outcome. Microprocessor controlled electric stepper motors position the mechanical reels to the selected game outcome.

The industry has moved from the mechanical determination of a game outcome to the almost exclusive use of electronic means to determine game outcomes. This has been a natural transition as mechanical components are generally much less reliable than their electronic counterparts. As mechanical components degrade with use, the random outcomes that the gaming machine generates gradually become non-random. The inability of mechanical gaming machines to reliably generate random outcomes has forced these gaming machines off the market. Yet, many players still prefer and trust gaming machines that provide mechanically selected game outcomes.

The appeal of mechanical type wagering games is so strong that many manufacturers have developed games that appear to have a mechanically determined outcome—but is actually determined electronically with a central processing unit. A number of different types of mechanical mechanisms can be used to display a game outcome: whether for a base or bonus game. In a base game, the electromechanical slot-type game described is very popular. In bonus games, it has become popular to use some type of mechanical element to display a game outcome. For example, some gaming machines include a bonus top box with a wheel a chance. Although the wheel appears to be a random device, it is in fact driven by a stepper motor. The stepper motor controls the precise position of the wheel, which ultimately stops the wheel at the game outcome, predetermined by the central processing unit.

The problem with these pseudo-mechanical games is that players are not completely convinced that they provide random outcomes. Often the movement of the mechanisms appears unrealistic or unnatural. Consequently, it would be desirable to provide a mechanical gaming device that provides players more realistic game outcomes.

It has been the desire of the gaming industry to provide gaming machines with more realistic gaming outcomes that are determined by a mechanical mechanism. The industry, however, has been thwarted by the inevitable problem of mechanical degradation in these types of gaming machines and the non-random results that they produce. This has prevented the commercial success of gaming machines with mechanically determined game outcomes.

The occurrence of random physical influences cannot be fully modeled or predetermined. Once a defect occurs, non-random outcomes are produced that skew the game probability distribution. This is unacceptable to both the regulatory authorities and the gaming establishment itself. Wagering games are tightly controlled and must return a required payback percentage to players.

A probability distribution skewed in one direction can create a loss for the gaming establishment. A probability distribution skewed in the opposite direction will fail to provide the required pay back percentage to the player and violate gaming regulations. To overcome this problem, a methodology is required to verify that gaming machines with mechanically determined game outcomes are operating to produce the required game outcome probability distribution.

What is needed is a gaming machine that can mechanically determine game outcomes while assuring that game outcomes remain random during the life of the gaming machine, or at least provide warning that the gaming machine is not producing random game outcomes.

SUMMARY OF THE INVENTION

The present invention can be used in any wagering game that uses a mechanical mechanism (i.e., a selector mechanism) to determine, or partially determine a game outcome. Examples of these types of wagering games include Pachinko, wheels of chance, and pinball type gaming machines. The problem with such games is that any manufactured device may have subtle defects introduced at the time of manufacture that will cause the machine to deviate from its required probability distribution. Furthermore, additional defects caused by use and degradation will accumulate and degrade the gaming machine and cause the device to further deviate from the required game outcome probability distribution. To detect unacceptable deviations in random behavior from the required game outcome probability distribution, statistical analysis of the actual game outcomes is performed on an ongoing basis. If the gaming machine is producing non-random game outcomes, it can be immediately and automatically shutdown.

Instead of shutting the game down, the gaming machine may be provided with a feedback control loop designed to modify the game's performance to eliminate inherent bias that creates non-random behavior. With the feedback control loop, the gaming machine's outcome probability distribution—when averaged out over the life of the game—may be made to conform to the required game outcome probability distribution.

The game outcomes may be trended and statistically analyzed to detect bias or anticipate bias in the selector mechanism. Once bias is detected, the appropriate countervailing bias required to eliminate the inherent bias is determined. The countervailing bias is introduced with a control device associated with the gaming machine that corrects the inherent bias, allowing the game outcomes, when averaged over time, to conform to the required game outcome probability distribution. The feedback control loop works to produce random game outcomes that conform to the gaming machines required game outcome probability distribution. With this feedback control loop, the gaming machine can be confidently operated knowing that it is continually adapting to ensure that the required game outcome probability distribution, and resulting payback percentage, are maintained when averaged over time.

BRIEF DESCRIPTION OF THE DRAWINGS

The foregoing and other advantages of the invention will become apparent upon reading the following detailed description and upon reference to the drawings in which.

Figure 1:
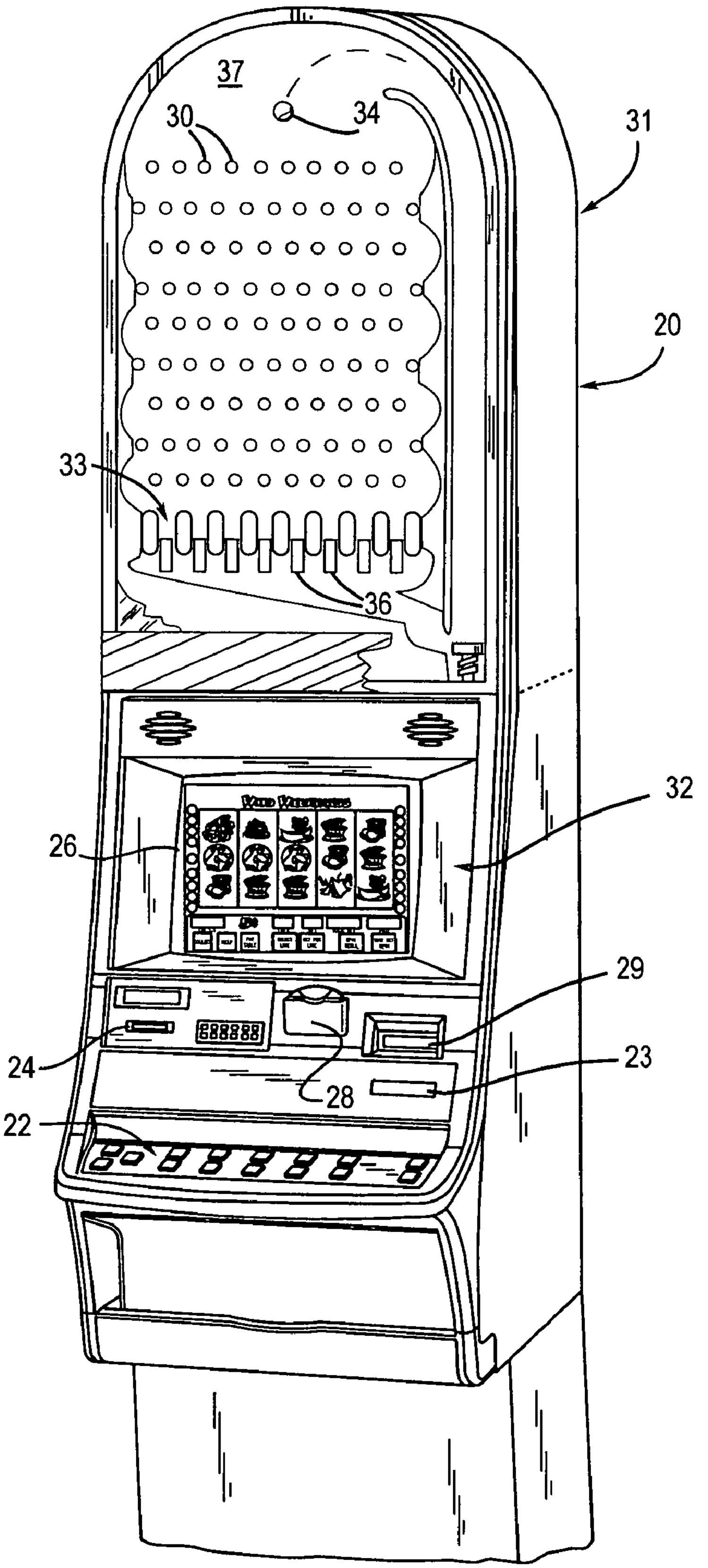
FIG. 1 is an isometric view of a gaming machine with a Pachinko type top box bonus game.

While the invention is susceptible to various modifications and alternative forms, specific embodiments have been shown by way of example in the drawings and will be described in detail herein. It should be understood, however, that the invention is not intended to be limited to the particular forms shown. The invention is to cover all modifications, equivalents, and alternatives falling within the spirit and scope of the invention as defined by the appended claims.

DESCRIPTION OF SPECIFIC EMBODIMENTS

The description of the preferred examples is to be construed as exemplary only and does not describe every possible embodiment of the invention. Many alternative embodiments could be implemented, using either current technology or technology developed after the filing date of this patent, which would still fall within the scope of the claims defining the invention.

A gaming machine having a mechanically or physically determined game outcome, in whole or in part, may be configured with a feedback control loop to ensure game outcomes that conform to a required probability distribution. For example, FIG. 1 shows a perspective view of a typical gaming machine 20 that may be used with the present invention.

Gaming machine 20 has a base game 32. The base game 32 shown in FIG. 1 is a typical slot-type gaming machine. Besides the base game 32, the gaming machine 20 shown in FIG. 1 also has a top box cabinet. The top box is a cabinet containing the bonus game 31 and is generally attached to the top of the base game 32.

Gaming machines 20, such as those shown in FIG. 1 have similar designs and are typically constructed from similar components and peripheral devices. It should be understood that many peripheral devices and interfaces exist that could be used in any number of combinations to create a variety of gaming machines.

For example, although the game machine 20 may be self-contained having its own central processing unit (CPU) 18 to perform calculations as necessary to operate the game software, it is also possible for the gaming machine 20 to be networked to a central server. The central server can perform all the calculations necessary to operate the gaming machine—in a sense the gaming machine becomes a "dumb" terminal (or, gaming terminal). The gaming terminal displays the game outcome and allows the player to make appropriate wagering decisions. For this network architecture, the gaming machine then becomes the dumb terminal and the central server in combination. This specific network architecture can also be referred to as a gaming system. Of course, the system architecture can range anywhere between and include these extremes in distributed computing.

In most gaming machines 20, the game is displayed to the player on a game display, such as a video game display 26. The video game display 26 may be a cathode ray tube (CRT) or a flat panel display (FPD). The video display 26 may include a touch screen 21 overlaying the monitor to allow players to make game related selections, or any other selections associated with gaming (e.g., wagering, selecting pay lines, etc.). In the alternative, instead of a video display 26, the gaming machine 20 may use mechanical reels to display the game outcome.

A wager can be accepted from the player to initiate game play on the gaming machine 20. The wager may be accepted by a coin acceptor 28 or a bill validator 29. Many gaming establishments also allow players to make a wager using a cashless gaming system.

Cashless gaming systems have been implemented by many gaming establishments. These systems often rely on ticket vouchers printed by ticket printers 23 installed in the gaming machine 20. A bar code is printed on each ticket voucher to identify the transaction and the monetary value of the ticket voucher. A player can insert the ticket voucher into a gaming machine's bill validator 29, which then transfers the monetary value of the ticket voucher to the gaming machine's credit meters. This limits the need for coins and/or paper currency.

A push button panel 22 is typically offered to allow players to make game selections that include selecting the number of paylines the player wishes to wager on, a maximum bet button to place the maximum allowable wager, and a spin button to initiate the spinning of the reels to determine a game outcome. A touch screen 21, as shown in FIG. 2, may also be provided to give players an alternative method for making game selections.

Many gaming machines are also equipped with a player tracking card reader 24. A player may be enrolled in the gaming establishment's player club and may be awarded certain complimentary services/offers as that player collects points on his player tracking account. The player inserts his card into the reader, which allows the casinos computers to register that player's wagering activity at that gaming machine.

Figure 2:
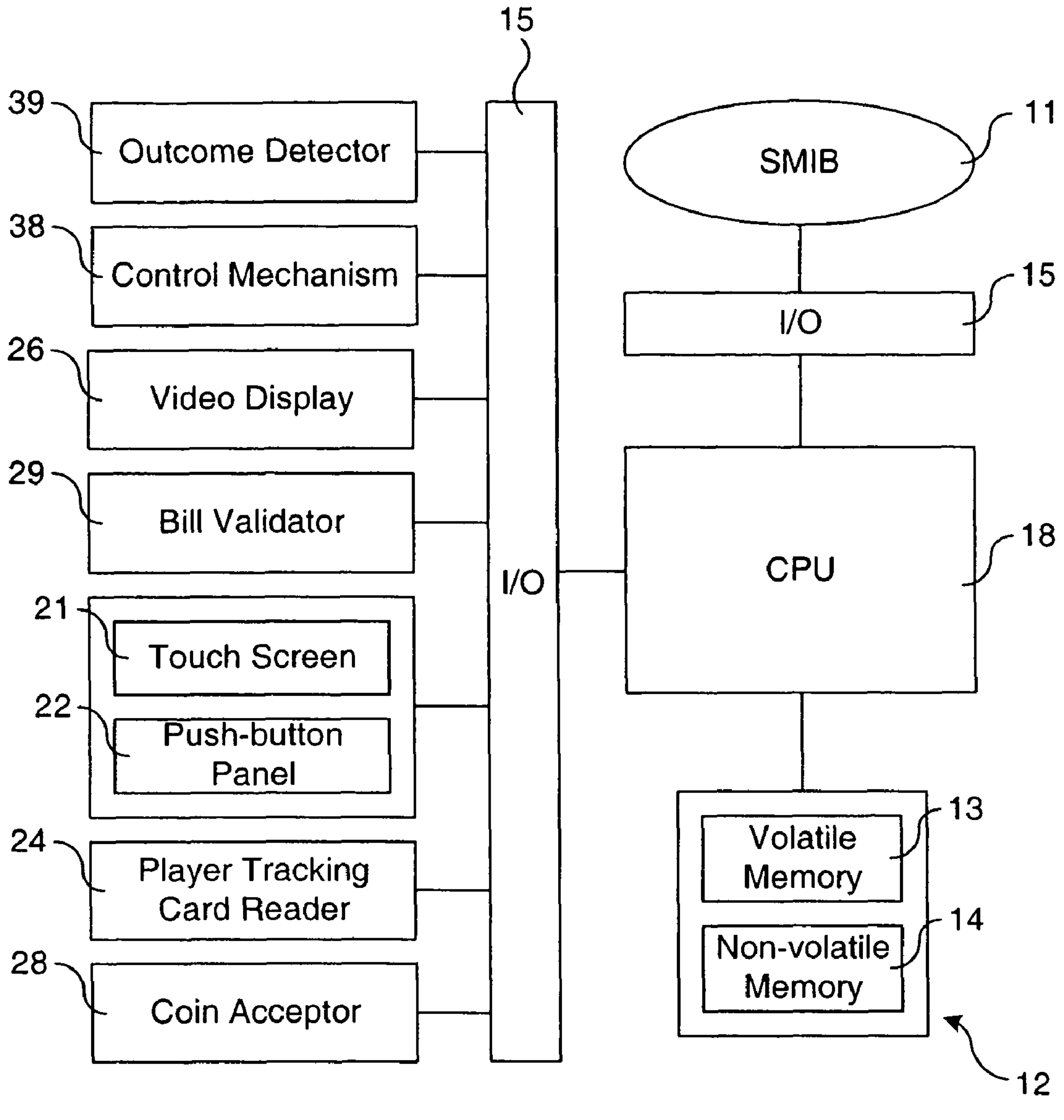
FIG. 2 is a block diagram of a control system suitable for operating a mechanical gaming machine.

The gaming machine 20 controls these peripheral devices using a central processing unit (CPU) 18 (such as a microprocessor or micro controller) as shown in FIG. 2. The number and type of peripheral devices vary depending upon the options and capabilities wanted for any particular gaming machine. FIG. 2 illustrates some of the many peripheral devices that the CPU 18 controls. These include: the push button panel 22, a player tracking card reader 24, a video display 26, a touch screen 21, and the bonus game 31. The CPU 18 may also control a control mechanism 38 to provide a countervailing bias to the gaming machine's inherent bias to correct the game outcome probability distribution.

Although only one microprocessor is shown, the CPU 18 may include multiple microprocessors and other ancillary electronic components. Even the peripheral devices themselves may use microprocessors to perform their functions.

Besides controlling each of the peripheral devices, the CPU 18 also controls the play of the game and determines any electronically determined game outcome with a software program stored in system memory 12. The system memory 12 stores control software, operational instructions, and data associated with the slot machine 20. The system memory 12 also contains a probability table to help determine the outcome of each game. Winning game outcomes are paid according to a pay table, which is also stored in memory. In one embodiment, the system memory 12 comprises a separate read-only memory (ROM) or Volatile Memory 13 and battery-backed random-access memory (RAM) or Non-Volatile Memory 14 as shown on FIG. 2.

The CPU 18 communicates with the various peripheral devices using an input/output (I/O) circuit 15. Although the I/O circuit may be shown as a single block, the I/O circuit may also include many different types of I/O circuits.

Game play is initiated in a standard slot-type gaming machine after a wager has been received and the game activated. The CPU 18 sets the reels in motion, randomly selects a game outcome, and stops the reels to display discrete symbols forming a basic array corresponding to the pre-selected game outcome.

To determine the random outcome, the CPU 18 uses a random number generator and a probability table to select the game outcome (e.g., a "base" game outcome) corresponding to a particular set of discrete reel "stop positions." At least one random number is associated with each possible stop position of the reels. The random number generated is used to look up the corresponding reel stop position in the probability table. The CPU 18 then causes each reel to stop at the predetermined stop position. The discrete symbols graphically illustrate the stop positions and show whether the stop positions of the reels represent a winning game outcome.

If the player achieves a winning outcome on an active pay line, the game credits the player an amount corresponding to the pay table award for that combination multiplied by the credits bet on the winning pay line. A payoff mechanism is operable in response to instructions from the CPU 18 to make the award to the player in response to the winning outcome.

In addition to winning game outcomes, the base game 32 may also include a start-bonus outcome in the base array for triggering play of a bonus game 31. The triggering event in the base game 32 causes the CPU 18 to shift operation from the base game 32 to the bonus game 31.

Figure 5:
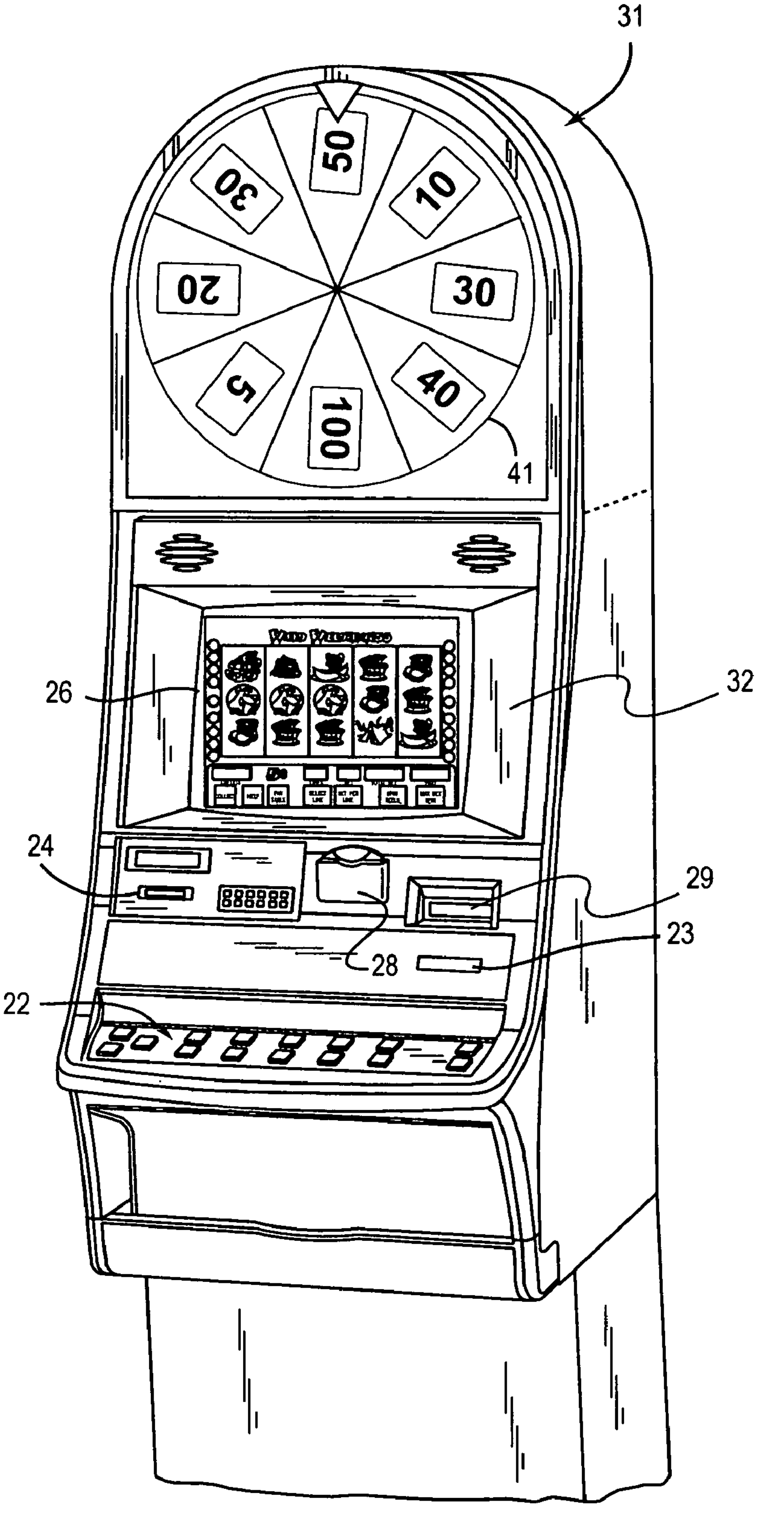
FIG. 5 is an isometric view of a gaming machine with a wheel of chance type top box bonus game.

The bonus game 31 in some gaming machines provides the appearance of providing a mechanically determined game outcome. In these cases, the CPU 18 randomly selects a game outcome using its random number generator and probability table. The randomly selected game outcome is then forced to occur, generally, by a stepper motor that drives a mechanical device to the predetermined game outcome. For example, many slot-type gaming machines have a wheel of chance bonus game as shown in FIG. 5. The wheel 41 is driven by a stepper motor controlled by the CPU 18. The CPU 18 causes the stepper motor to rotate the wheel to the predetermined game outcome position.

In contrast, in the claimed invention, the CPU 18 does not predetermine the game outcome. Instead, the game outcome is determined, at least in part, mechanically with a selector mechanism 40. The selector mechanism 40 is any part or components in a system that, at least partially, physically determines a game outcome. For example, in the embodiment shown in FIG. 1, the selector mechanism 40 in the gaming machine 20 is a Pachinko style top box bonus game 31.

The Pachinko ball 34 falls vertically through a playing field 37 of pegs 30 and exits the field through one of a plurality of exit lanes 33. The exit lane 33 through which the Pachinko ball falls has an award marker 36 that determines the bonus awarded to the player. The exit lane has an outcome detector 39 (e.g., a mechanical or electronic switch placed in each of the exit lanes to detect the passing of a Pachinko ball), which signals the CPU 18. The CPU may then provide the player with the award shown on the award marker 36.

The selector mechanism 40 of the Pachinko bonus game includes the ball 34, the play field, the pegs, the exit lanes, etc. Each of these components in this selector mechanism 40 affects the game outcome. Other examples of selector mechanisms 40 include, wheels of chance, lottery ball blower devices, a die cage, etc.

Each game outcome may have one of several different potential physical outcomes that the selector mechanism 40 can produce to determine an award or another event. Each of these different physical outcomes can be denoted as an outcome category.

Figure 3:
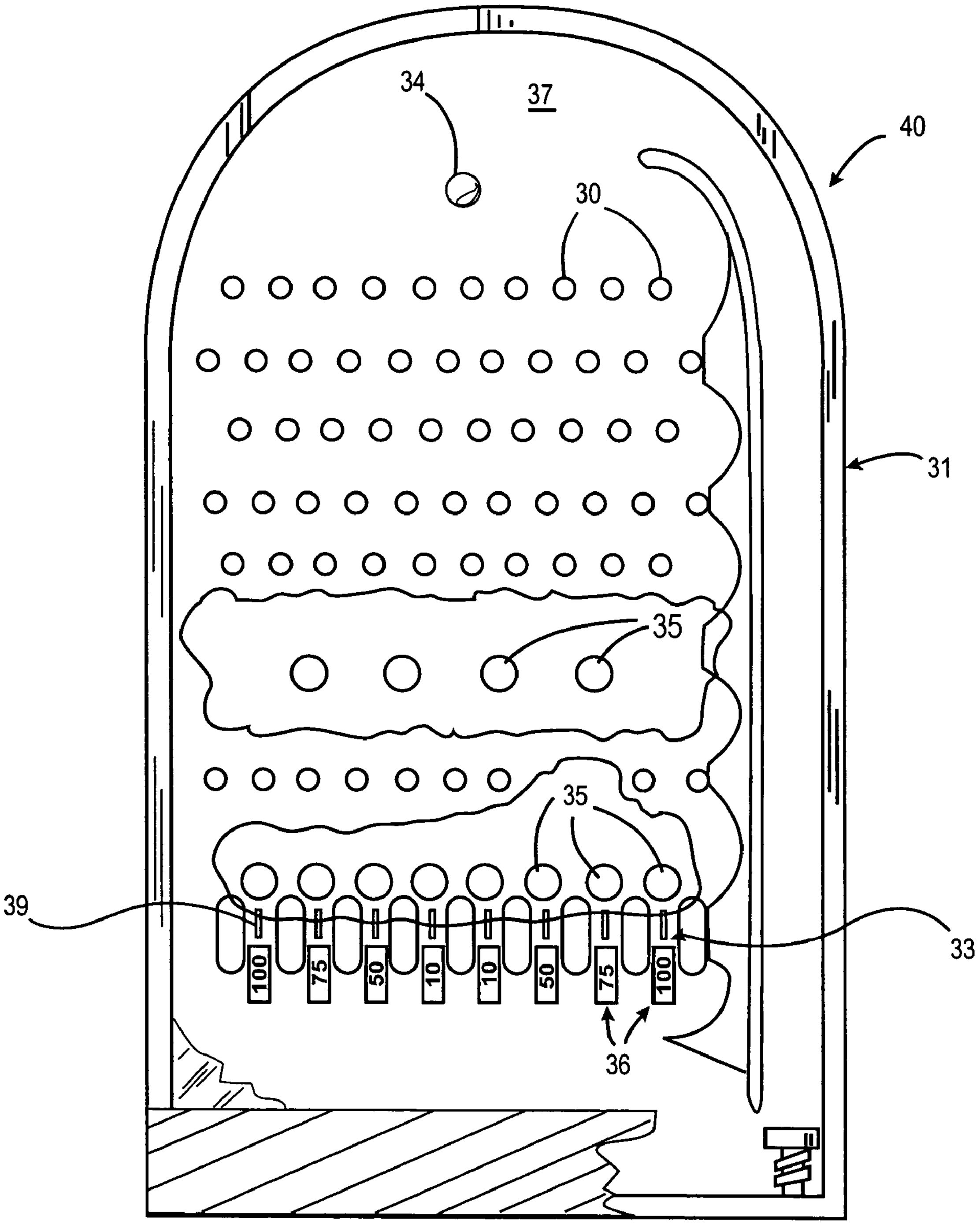
FIG. 3 is the Pachinko type top box bonus game of FIG. 1.

For example, in the Pachinko game shown in FIG. 3, there are eight different possible physical outcomes associated with bonus game 31—one physical outcome associated with each exit lane. These physical outcomes, (i.e., outcome categories) can be associated with each game outcome. For each game outcome, the CPU 18 collects this outcome category data to statistically analyze the gaming machine's game outcome probability distribution to detect non-random behavior. Unlike the game outcomes produced by a random number generator, mechanical determined game outcomes are subject to physical influences that can produce non-random results.

A wagering device that produces game outcomes based on a physical system can be skewed because of latent manufacturing defects and use related degradation. These non-random outcomes skew the mechanical system from its designed game outcome probability distribution (which becomes the required game outcome probability distribution once the gaming machine is operating). The game outcome probability distribution is produced by averaging an infinite number of game outcomes and is a relative measure of the predominance of each game outcome to all the other possible game outcomes.

In order for a wagering game with mechanically determined game outcomes to be practical and acceptable to both regulatory authorities and gaming establishments, a methodology must be devised that can detect non-random behavior. Once non-random behavior is detected, it is desirable for the gaming machine to correct the bias to achieve the required game outcome probability distribution.

The heart of the problem of detecting non-random behavior is that no finite sequence of numbers can be definitively proven random or non-random. Because any empirically generated sequence of outcomes will be finite, there is no final answer to the question of whether or not the device is performing randomly in an absolute sense. When a system is sampled further, any finite sequence of outcomes can begin to repeat, making it completely predictable and non-random, or can become random after being seemingly predictable. Wagering games, fortunately, only require outcomes to be similar to truly random sequence in certain ways that make them unpredictable in practice to the player.

The behavior of a truly random device can be approximated in many ways by non-random devices. Computers that use mathematical formulas to develop a sequence of pseudo-random numbers are an example of a completely predictable device that can generate sequences of outcomes that effectively model random devices.

The pseudo-random number generator, although it produces completely predictable game outcomes, can provide what appear to be random outcomes. These outcomes over a long period conform to a required game outcome probability distribution in a way that is indistinguishable from outcomes generated by a truly random process. Similarly, combinations of pseudo-random and physically or mechanically random outcomes will produce sequences of events that are indistinguishable from completely random events.

Any manufactured gaming device that relies on a CPU 18 to generate pseudo-random numbers will exist as a finite state machine and have a well-defined game outcome distribution. Devices that generate random outcomes based on mechanical processes (e.g., a Pachinko game), however, can have a variety of defects that will adversely affect the randomness of its outcomes. Mechanical systems will deviate from ideal random systems in a myriad of unobservable ways that although subtle, will unacceptably alter the game outcome probability distribution.

Other deviations from ideal system behavior, e.g., a blocked exit lane in a Pachinko game, will drastically bias the machine. These defects, while still critical are generally easily detectable, either through ancillary sensing mechanisms or through statistical analysis of the game outcomes. Because equipment failures are always possible, games with mechanically derived outcomes are most suited for low volatility games. High volatility games with large jackpot prizes run the risk of erroneously paying out jackpots due to a mechanical failure. Even one such error may not be acceptable and the feedback control loop would not be effective for such an acute catastrophic system failure. In addition, it is easier to detect and correct bias in low volatility games.

A variety of statistical tests can detect minor defects and anomalies that cause mechanical systems to depart from ideal operation. These statistical tests can be applied to a collection of game outcomes to determine if the device is functioning properly. The confidence level with which the device can be said to be functioning properly (or malfunctioning) will depend on the number of samples (game outcomes) used to determine confidence level. More samples will give a greater confidence, but the number of samples it takes to reach a given level of confidence will depend directly on the underlying ideal game probability distribution and the degrees of freedom (i.e., the number of measured outcome sources) in the probability space.

A coin that lands on heads with probability p that may or may not equal 0.5. One can generate a number of samples with the coin and apply a test, such as the Chi-square test, to establish the likelihood that the coin is behaving as an ideal mechanical system (i.e., equal probability of heads or tails). A common confidence for Chi-square is 0.05, meaning that there is a 1 in 20 chance that the device is working properly although it fails the Chi-square test. For 100 flips of a fair coin (p=0.5), this allows the average number of heads, 50, plus or minus 9, before rejecting the coin as biased since even for an ideally random coin, 1 time in 20 the number of heads flipped during a sequence of 100 flips will be less than 41 or greater than 59.

In some ways, this test is inadequate for gaming devices with rare outcomes as they will have only a small influence on the measure, but rare outcomes behaving properly are often key to the proper function of the device. For example, high volatility games with very large jackpots produce winning jackpots infrequently. Consequently, a lack of a jackpot hit in a sample, although appearing normal, may not indicate whether the jackpot can be hit at all. For low probability events, we have the following situation. Let p=0.01—a probability value that is typical for bonus events in slot machines—then more than 380 flips without heads would still not register as an incorrect model. Conversely, if heads are achieved in the first 17 flips, the coin will also fail the test. Consequently, low probability outcomes, if they are hit too often, will quickly be identified—even with small data sets. Conversely, extremely large data sets are required before a low probability outcome is identified as biased away from being hit.

The large sample size required and the confidence levels achieved with small probability outcomes indicate the desirability of a system that can explore its outcome space quickly to confirm proper behavior. Unfortunately, this would also produce wear on a mechanical device, which could potentially create problems. One approach to overcome this problem is to proactively modify the mechanical system before a determination that the system is biased.

Whether or not the system is biased, the system output may be modified to make it closer to ideal by decreasing the volatility without compromising the overall unpredictability of the system. Any modification that provides a random outcome that targets the required game outcome distribution is acceptable. Ideally, such a modification is undetectable by the player. The modification, however, must be implemented in a way that the player cannot take advantage of the system.

As an example of such a method that fails to be unpredictable and could potentially be exploited, consider a bonus forced to occur at least once every hundred spins. If a player sees 99 games go by without a bonus, it is known that the next spin will trigger a bonus. If they can drastically increase their bets at that point, then they can take advantage of the fact that they will be playing a game that returns more than 100% on that spin. If, however, the natural output of the system is replaced with an artificial game outcome pseudo-randomly generated, the introduction of correlations into the data that a player can detect (and potentially exploit) is avoided.

To determine when and how to appropriately modify the gaming system to correct system bias and avoid the introduction of correlations into the game outcomes, the mechanical system must be modeled upon its as designed game outcome probability distribution. The designed probability distribution functions as a baseline to detect non-ideal performance in the actual system and to quantify the degree of bias present. Statistically significant deviation in the performance of the actual system from its designed or required probability distribution triggers the control mechanism 38 to modify the selector mechanism's 40 performance and correct the system's biased behavior.

The problem of influencing system behavior to conform to a desired distribution is a young field of mathematical research. See, for example, *Annals of Probability* 12 (1984), "Tree Algorithms for Unbiased Coin Tossing with a Biased Coin" by Stout and Warren, which concludes that there is not one scheme that will unbias all biased coins. On a more practical level, game outcomes need pass only a few simple tests for randomness to be suitable for gaming. If the modifications to the game outcomes respect those tests, the actual game output distribution can be corrected to conform to the required distribution.

Suppose a device is made from two visually identical coins where the bias could not be controlled precisely during manufacture, but one produces mostly heads, and the other mostly tails. The precise biases of these coins could be determined either as the game is played, or during production, but once known, even if not known exactly, they can be combined to produce a random sequence.

If one coin has heads $\frac{1}{3}^{rd}$ of the time, and the other tails $\frac{1}{3}^{rd}$ of the time, then alternating between the two would produce a sequence that is unbiased in the sense that heads and tails are equally likely. Nevertheless, it would fail run tests for randomness since alternating heads and tails would be more likely than it should be. Therefore, although the game distribution target is satisfied, the individual game outcomes are not random. However, if a coin is randomly chosen on each flip, with probabilities determined by the relative biases of the coins, then additional correlations will not be introduced.

For the sake of prediction in gaming devices, there is a reasonable point beyond which independence of results can be sacrificed without making the device predictable in any realistic way. For example, rather than alternating coins, a sequence of coin choices could be selected that repeats after 10,000 samples. A single player would require roughly one full week of continuous play to complete a 10,000 sequence of coin play (based on the game being played 10 times a minute). Since players will not have access to that much information, and even if they did, cannot correlate that information, it could be safe to sacrifice independence of events at that point. Furthermore, playing enough games to generate this data would ensure that the casino would, on average, be able to cover any potential loss on these games that violate independence of events in some way.

Over time, the strength of biases may vary and produce different effects on the game outcome probability distribution. Consider a game that uses a biased coin where the device is a coin toss with unreliable bias that needs to perform as an unbiased coin. This is similar to the Pachinko game, which may have any number of physical defects that change over time to produce non-random game outcomes and deviation from the required probability distribution. To achieve unbiased outcome distributions, the coin must be biased artificially to produce a known or approximately known bias. An example could be a novelty coin that changes its bias in an unknown way with each use. Using magnets, however, the coin can be reliably biased to be predominantly heads or tails.

A test hypothesis of the bias of the coin is developed and performance data collected from the game to refine the estimate of the bias using Chi-square type tests. Suppose this gives the result that P (heads)=0.7. To unbias the coin, tail outcomes must be artificially added. A simple calculation of the overall expected outcome, where tails is artificially imposed on the sequence of events with probability f, gives us the goal that for an unbiased coin, the probability of getting heads is equal to the probability of getting tails, so $$(1-f)*0.7=(1-f)*0.3+f$$

Using simple algebra, we solve for f to find that $f=\frac{4}{14}$.

Replacement of the random coin with one that lands on tails approximately 28.57% of the time, if the random coin passes tests for independence, the overall device should also pass these tests. This formula can be generalized to work for any bias (except 0 or 1). This formula can also be modified to adapt to a coin with a slowly changing bias (as determined by a Chi-square type test being run adaptively on game play data).

This approach can be generalized to systems with more degrees of freedom (i.e., more potential outcomes) as shown in the Pachinko game of FIG. 1 by individually considering each potential game outcome. A specific game outcome in Pachinko will have an empirical probability of occurring that can be determined with more accuracy as more game outcomes are determined. If this empirical probability is different from the designed or required probability, then the system can be biased randomly to bring the total game distribution close to the ideal.

If deviation from random behavior is detected, the CPU 18 signals the control mechanism 38 to impose a countervailing bias to achieve the required probability distribution while still providing unpredictable game outcomes. The appearance of randomness produced by this control mechanism 38 is analogous to the randomness created by the CPU's pseudo-random number generator. The modification of the mechanical system to intentionally bias game outcomes achieves the required game outcome probability distribution while still maintaining what appear to be random individual game outcomes. Randomly invoking this intentional bias can reduce any correlations between game outcomes to satisfy tests of independence.

For example, in the Pachinko game shown in FIG. 3, the Pachinko game may record each instance that a ball passes through a specific exit lane 33 with the outcome detector 39 to record the outcome category of each game outcome. This data is collected and stored in a database in system memory 12 from which an empirical statistical model can be built to verify that the game performance conforms to the required game outcome probability distribution.

The statistical modeling can be simple or very sophisticated—taking into account trends and correlating events with changes in system performance. For example, a model can be developed that trends the probabilities of each game outcome over time and projects when the game is in danger of being classified as non-random. Statistical probabilities can be established for different periods, such as between maintenance activities and any other anomaly that might create a system bias. Furthermore, statistical analysis can be made of grouped game outcomes. For example, adjacent exit lanes 33 may be grouped in the Pachinko game of FIG. 1. This provides the capability to identify areas of the playing field 37 that are acting non-randomly.

Regardless of the sophistication of the statistical model, the model must detect bias in the selector mechanism 40. Deviation from the required probability distribution is used to detect bias and provides a feedback loop to the control mechanism 38 to modify the system to correct the bias.

To detect inherent bias that occurs in any mechanical system, the designed or ideal probability distribution must first be determined for the system. One method of obtaining this ideal probability distribution is to create a mathematical model to analyze the behavior of the system as though it operated perfectly. The mathematical model may evaluate physical parameters and physical laws to model the operation of the system. This mathematical model includes kinetic and dynamic equations to mirror the play of a perfect mechanical game.

With a mathematical model of the ideal system, a statistical analysis can be performed, such as a Monte Carlo analysis, to determine the game outcome probability distribution. This data may be used to obtain the required probability distribution, which acts as the baseline for detecting bias in the actual mechanical system. In the Pachinko game shown in FIG. 1, the probability distribution curve determines the probability that the Pachinko ball 34 will land in a particular exit lane 33.

Alternately, the probability distribution may be determined from a calibrated physical model of the system. Empirical data collected from the model determines the system's game outcome probability distribution.

Either of these methods for determining the baseline probability distribution may be used for gaming machines with complex selector mechanisms 40. For a simplistic selector mechanism 40, such as a wheel of chance, the selector mechanism by inspection (for a perfect system) has an equal probability game outcome for all possible game outcome categories.

Using a probability distribution based on an ideal model of the system ensures that the actual game outcome distribution is achieved in what appears to be a random and natural manner, because the game outcome probability distribution matches the mechanical characteristics of the game. One advantage of using a matched probability distribution is that it most closely represents the actual physical performance of the system—requiring the least interference with the system to correct bias.

Figure 9:
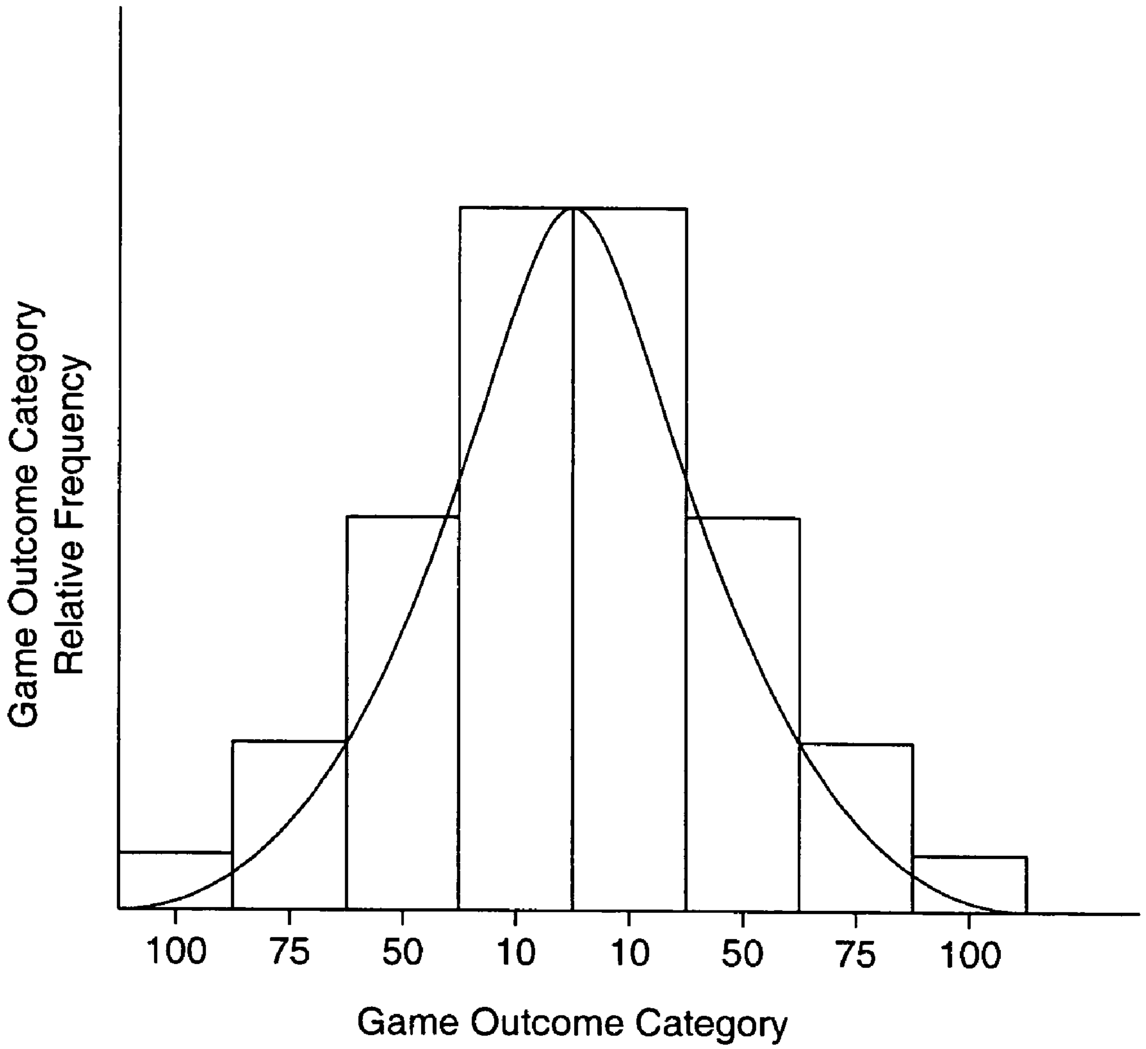
FIG. 9 is a game outcome probability distribution curve having unequal game outcome probabilities.

For example, in the top box Pachinko bonus game 31 of FIG. 3, based on the mechanical configuration of the bonus game, it might be expected that the outer exit lanes will hit less frequently than the middle exit lanes. Consequently, the game outcome probability distribution curve will be highest in the middle and lowest at the ends as shown in FIG. 9.

Figure 10:
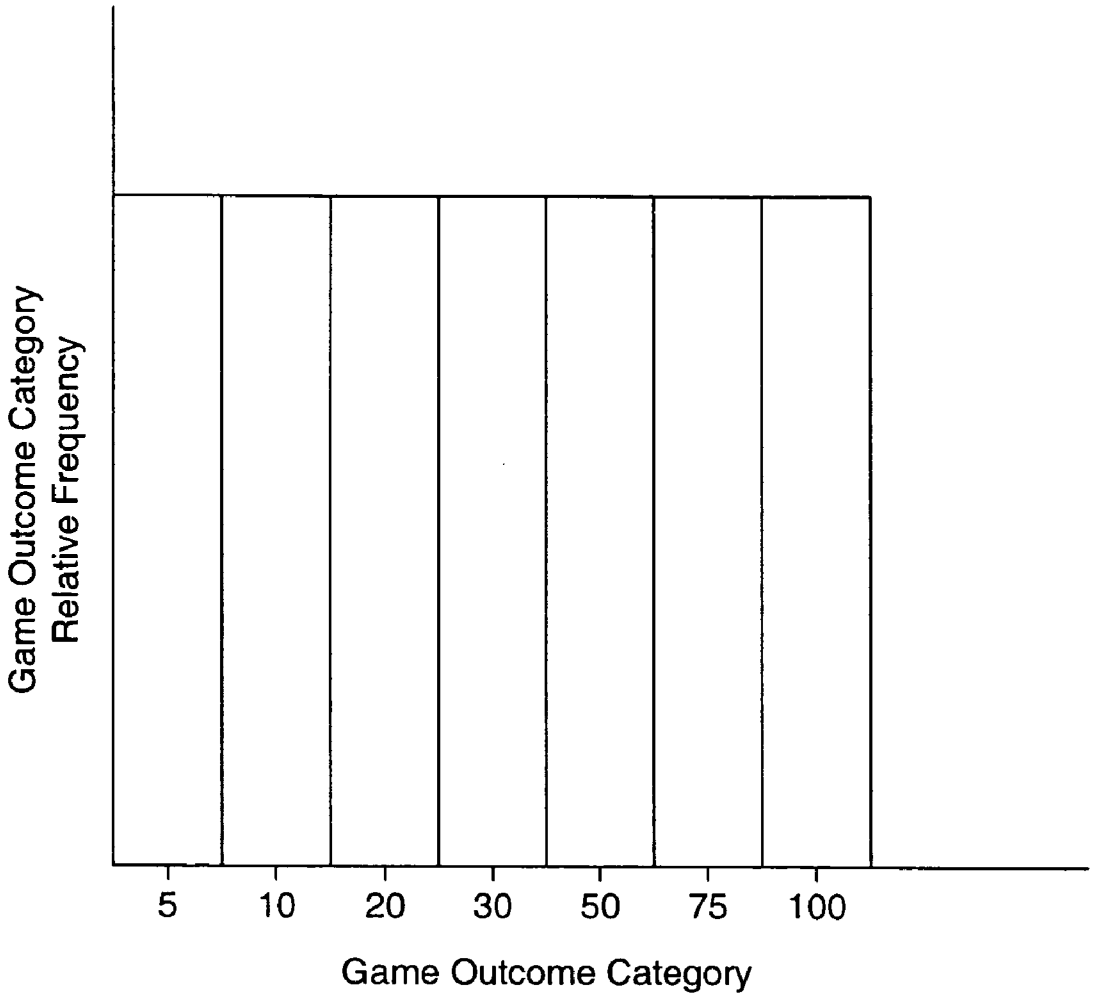
FIG. 10 is a game outcome probability distribution curve having equal game outcome probabilities.

In the case of the wheel of chance bonus game shown in FIG. 5, an unbiased wheel will produce any game outcome with equal probability. The game outcome probability distribution shown in FIG. 10 will be flat to match the expected behavior of the selector mechanism 40. This flat probability distribution is appropriate for any gaming device where no outcome occurs more frequently than another outcome.

There are, however, certain circumstances under which it may be desirable to mismatch the probability distribution with the expected outcomes for a given mechanical system. It may be desirable to force the system to provide a high probability of low payouts and a low probability of a high payout. Such a system allows a game to offer the potential for a higher payout that is attractive to players. Without intentional bias, however, the high payout award might skew the pay back percentage sufficiently to make the game uneconomical for gaming establishments to offer. Although this game might be noticeably non-random to a long-term player, it still achieves the practical objective of providing the potential for a high payout.

Regardless of whether the game outcome probability distribution mirrors the actual mechanical gaming system or is modified to weight certain game outcomes, deviation from the required probability distribution identifies bias that can be controlled with the control mechanism 38 as directed by the CPU 18.

Statistical confidence levels using the Chi-square analysis detect bias in system operation. Statistical calculations can be made each time a game outcome occurs by the outcome detector 39. The game outcome category is communicated to the CPU 18 for statistical analysis. This allows constant surveillance and monitoring of the gaming machine to detect bias at the earliest possible time. If bias is detected, the gaming system may be modified with the control mechanism 38 to exert a countervailing bias to bring the selector mechanism 40 back toward the required probability distribution. The feedback control loop includes the outcome detector 39, the control mechanism 38, and the CPU 18.

For example, assume that each exit lane 33 in the Pachinko game has a game outcome probability distribution as described in FIG. 9. If the middle exit lane 33 is determined through Chi-square analysis to have a lower probability than its adjacent exit lanes 33, the gaming machine may be modified to increase the probability that the middle exit lane will be hit. There are any number of ways to intentionally bias the selector mechanism 40 to achieve this outcome.

Figure 7:
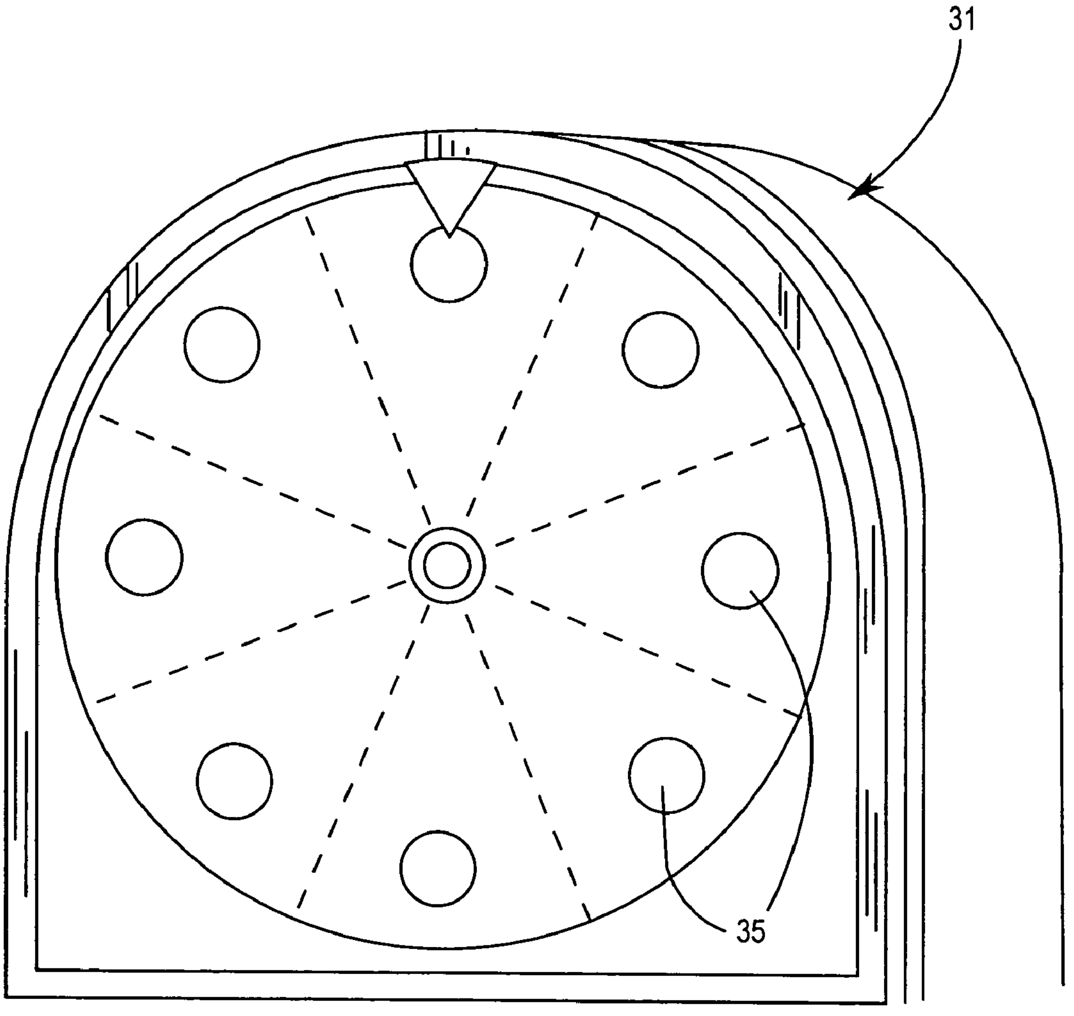
FIG. 7 is the wheel of chance type top box bonus game of FIG. 5 with the wheel removed.

For example, the control mechanism 38 may bias the game outcomes using magnetic fields produced by a system of magnets 35 to influence game outcomes. In the example of the Pachinko game shown in FIG. 3, magnets 35 may be located immediately above the exit lanes 33 and behind the Pachinko playing field 37 (to hide the control mechanism from player view). Similarly, as shown in FIG. 7 (with the wheel of chance removed from the top box bonus game), a single magnet or a series of magnets can be placed behind the rotating wheel to influence the stopping position of the wheel. At least two different methods may be used to create these magnetic fields.

Permanent magnets may be used to create a magnetic field. Permanent magnets are positioned adjacent to the playing field 37 to influence the movement and direction of the Pachinko ball 34. The magnetic field may be removed by moving the permanent magnet away from the playing field 37. Alternatively, electromagnets may be permanently placed in close proximity to the playing field 37 and alternately energized and de-energized to create magnetic fields as needed to correct inherent selector mechanism 40 bias.

To provide a more realistic appearance to the player, additional magnets may be added to more gradually affect the path of the Pachinko ball. This additional control is gained without producing an unnatural looking game outcome. These additional magnetic fields are located higher on the game board and shown in FIG. 3.

The magnetic field strength created by the magnet system is designed to accommodate any reasonable expected inherent bias. The maximum strength of the correcting forces applied must be minimized to allow the selector mechanism 40 to give the appearance of a random mechanical selection. Yet, the countervailing bias produced by the magnetic fields must be sufficient to overcome expected inherent bias to achieve the required probability distribution.

In another embodiment, variable magnetic field intensities can be created—the highest magnetic field intensity corresponding to that which still produces a natural response. Variable magnetic field intensity allows the lowest magnetic field intensity that achieves the desired bias to be used. This maintains the natural appearing performance of the system. Successively higher magnetic field intensities may be used should the previous lower field intensity be insufficient to correct the inherent bias.

Referring to the Pachinko game example shown in FIG. 3, to counterbalance the lack of hits on the middle 10-credit exit lanes 33, the CPU 18 creates a magnetic field in front of the entrance to the 10-credit exit lane. This magnetic field influences the movement of any Pachinko ball in its vicinity to preferentially exit the 10-credit lane. Although this magnetic field influences the Pachinko ball 34 to the 10-credit exit lane 33, it does not ensure that the ball will not fall into either of the adjacent lanes. This indeterminate, variable response maintains the appearance of a naturally performing mechanical system. However, on average, the 10-credit exit lane will begin to experience more hits than previously experienced before the imposition of the magnetic field.

With the bias in place, the CPU 18 can empirically calculate the probability distribution of the intentionally biased system. These calculations can confirm that the intentional bias is sufficient to bring the system back to its required probability distribution.

Because the countervailing bias must be strong enough to overcome the inherent bias in the system, for any correctable inherent bias, the countervailing bias will eventually overcorrect the system. Under normal circumstances, the intentional bias will correct the inherent bias and bring the system back into equilibrium with the required probability distribution. The data collected from the system performance before the intentional biasing is combined with the system performance after intentional biasing to obtain a cumulative probability distribution. Once the cumulative probability distribution conforms to the required probability distribution, the intentional bias imposed on the system is removed.

When the countervailing bias is released, the original inherent bias will return (unless otherwise replaced or removed by additional biases) and the system will again be biased away from the middle exit lane. The performance of the gaming machine after the intentional bias has been removed is trended to determine if the condition of the gaming machine is identical to that which initially created the need for intentional biasing.

The collection of additional system performance data after the system is intentionally biased provides data that allows more accurate modeling of the inherent system bias. This allows future deviations from the required probability distribution, particularly after the intentional bias is released, to be more rapidly recognized and corrected.

If the previously determined inherent bias is still present, the gaming machine may proactively respond before significant deviation from the required probability distribution occurs to offset the inherent bias by re-imposing an intentional bias.

In this example, this means alternately imposing magnetic fields in front of the 10-credit middle exit lanes 33 to maintain the desired game probability distribution. The dynamic selection and placement of magnetic fields near the entrance of each exit lane 33 in response to the continuous statistical analysis of each game outcome ensures that the gaming machine 20 operates randomly despite inherent bias in the mechanical condition of the gaming machine.

The example provided above is a simplistic description of the operation of the feedback control loop. Although only one magnetic field is discussed, many different combinations of multiple magnetic fields may be alternately imposed to achieve the required probability distribution. For example, more than one exit lane 33 may experience deviation from the ideal probability distribution and multiple magnetic fields may be required simultaneously to correct multiple biases. Further complications are introduced if these fields interact.

The introduction of intentional bias in the system produces collateral effects that further affects the game's probability distribution. For example, increasing the hit rate of one specific exit lane 33 reduces the hit rate of either one or both of the adjacent exit lanes. The reduced hit rate in the adjacent lanes 33 may require compensation dependent on the historical hit rates experienced by the adjacent lanes. Consequently, the intentional bias initially placed on the system to correct the inherent bias may create further bias that must be corrected.

It is possible that the intentional bias placed on the system cannot overcome and correct the inherent bias in the system. The number of game outcomes required before the gaming machine shuts down is dependent upon the statistical data acquired before and after the imposition of the intentional bias. For example, if a very low probability game outcome is achieved in rapid succession, very few game outcomes are needed to determine that the inherent bias is not correctable. Conversely, a very low probability game outcome that is not hit may require a very large game outcome data set to detect bias.

If the intentional bias is insufficient to correct the probability distribution, the CPU 18 will shut the game down. It is desirable to predict circumstances under which the imposed intentional bias will be insufficient to correct the inherent bias so that the gaming machine may be shut down as soon as possible. Insufficient intentional bias can be detected by analyzing the probability distribution data from the intentionally biased gaming system. The response of the system to the intentional bias can verify that the intentional bias will be sufficient to correct the inherent system bias. For example, the actual game outcomes of the intentionally biased system can be compared to the game outcome probability distribution anticipated for an intentionally biased system without inherent bias.

Just as the selector mechanism 40 output can be modified by the control device to correct for bias, deviation from required game outcome distribution can also be corrected by modifying the payout values associated with an outcome category. More specifically, rather than influencing the outcome category for each game outcome, the payout value for individual outcome categories is changed to ensure that the payback percentage for the gaming device is maintained—which is the ultimate goal whether it is done through influencing physical game outcomes or controlling the payouts associated with a particular game outcome category.

This approach uses the same Chi-square testing mathematical methodology described above to detect bias in the selector mechanism 40. Once a deviation from the required probability distribution is detected however, rather than intentionally biasing the physical system, the winning payout amounts for a given game outcome are changed to cumulatively achieve the required payback percentage.

This approach is less forgiving of larger deviations from the mechanical ideal as such deviations are not corrected in this embodiment and may become noticeable to the player. This detracts from the entertainment value of the game. For smaller deviations, however, changing the award associated with a physical outcome provides a reasonable methodology to achieve the required payback percentage.

Figure 4:
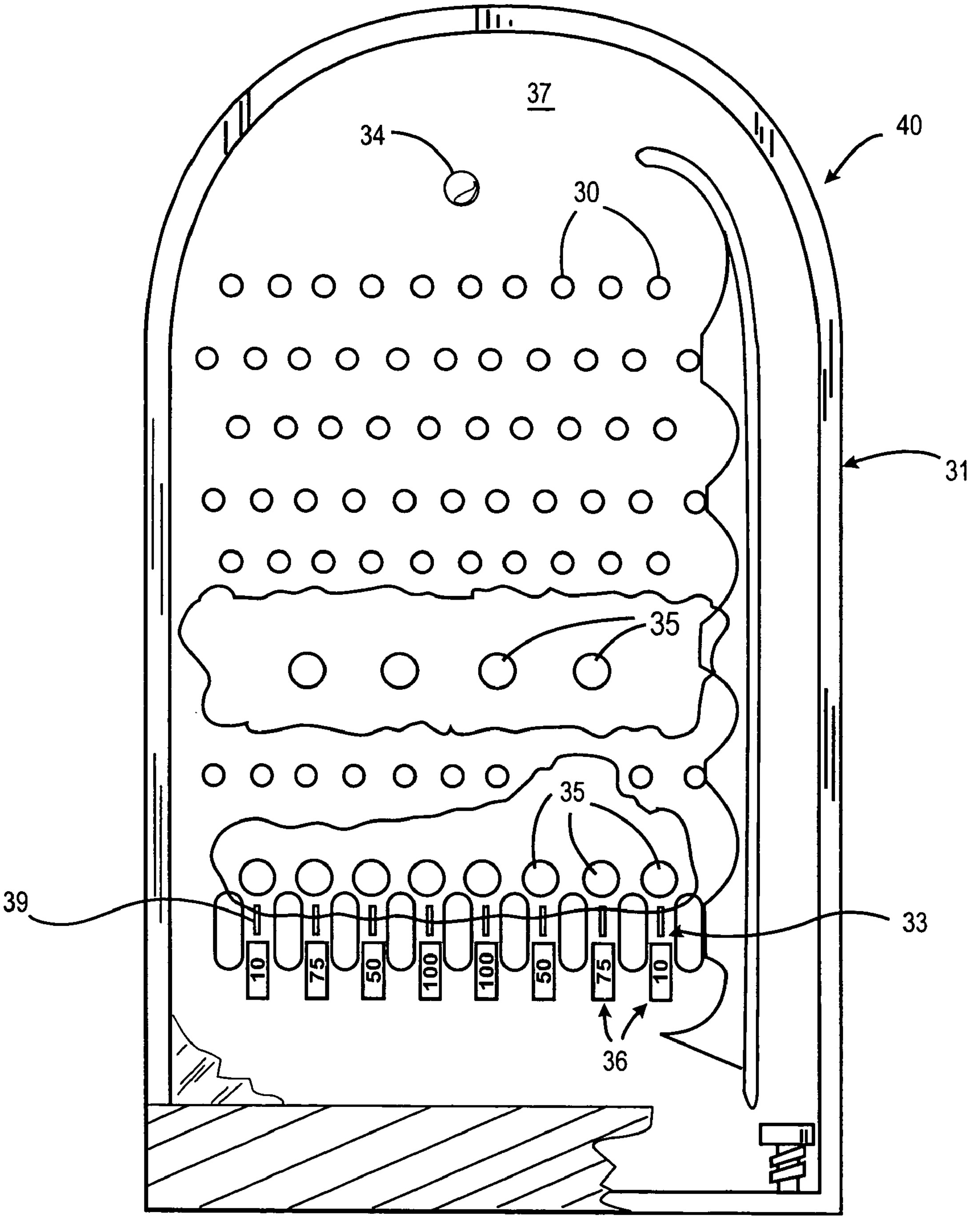
FIG. 4 is the Pachinko type top box bonus game of FIG. 3 in a second bonus prize orientation.

For example, in the Pachinko game shown in FIG. 3, if the 100-credit exit lanes are hit too frequently, it can be immediately assumed that the payback percentage is too high. Rather than imposing magnetic fields to direct the Pachinko ball 34 toward the center exit lanes 33, the 100-credit award markers 36 could, for example, be switched with the 10-credit award markers to compensate for the system bias as shown in FIG. 4. This is easily accomplished when the award markers 36 are LEDS or otherwise electronically displayed.

Another approach for correcting the payback percentage is to assign a new value to the 100-credit award markers, for example reducing the award value for that outcome category. The replacement value may be flexibly selected based on the degree of bias in the 100-credit award marker 36. If the bias is minor, the 100-credit award marker can be changed to 75-credits. If the bias is significant, the 100-credit award marker can be changed to a 10-credit or zero credit marker. The award markers can be changed as needed until the required payback percentage is obtained.

The changing of the award markers 36 can be incorporated into the game play and occur on what appears to be a random basis or in response to some trigger event that occurs during the normal course of the game. However, the credit selection of the award markers 36 is anything but random and is predetermined based on the bias of the exit lanes 33.

Figure 6:
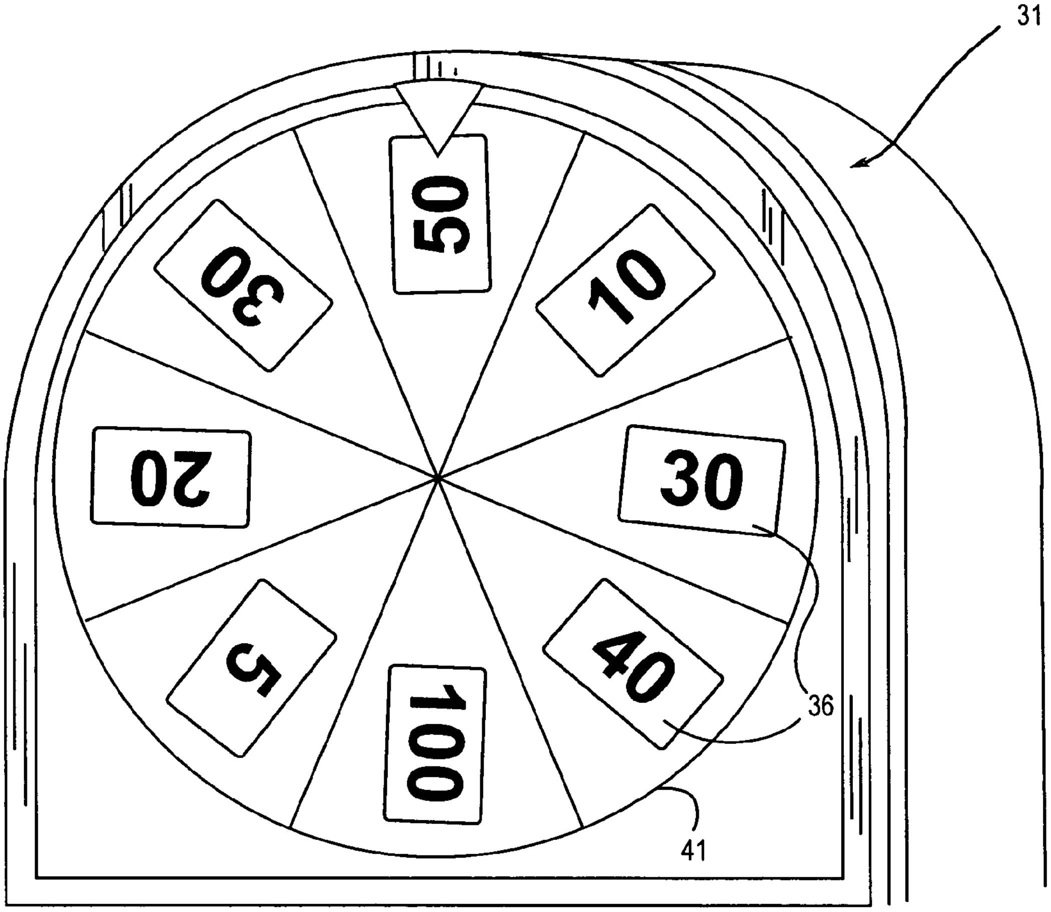
FIG. 6 is the wheel of chance type top box bonus game of FIG. 5 in a first bonus orientation.
Figure 8:
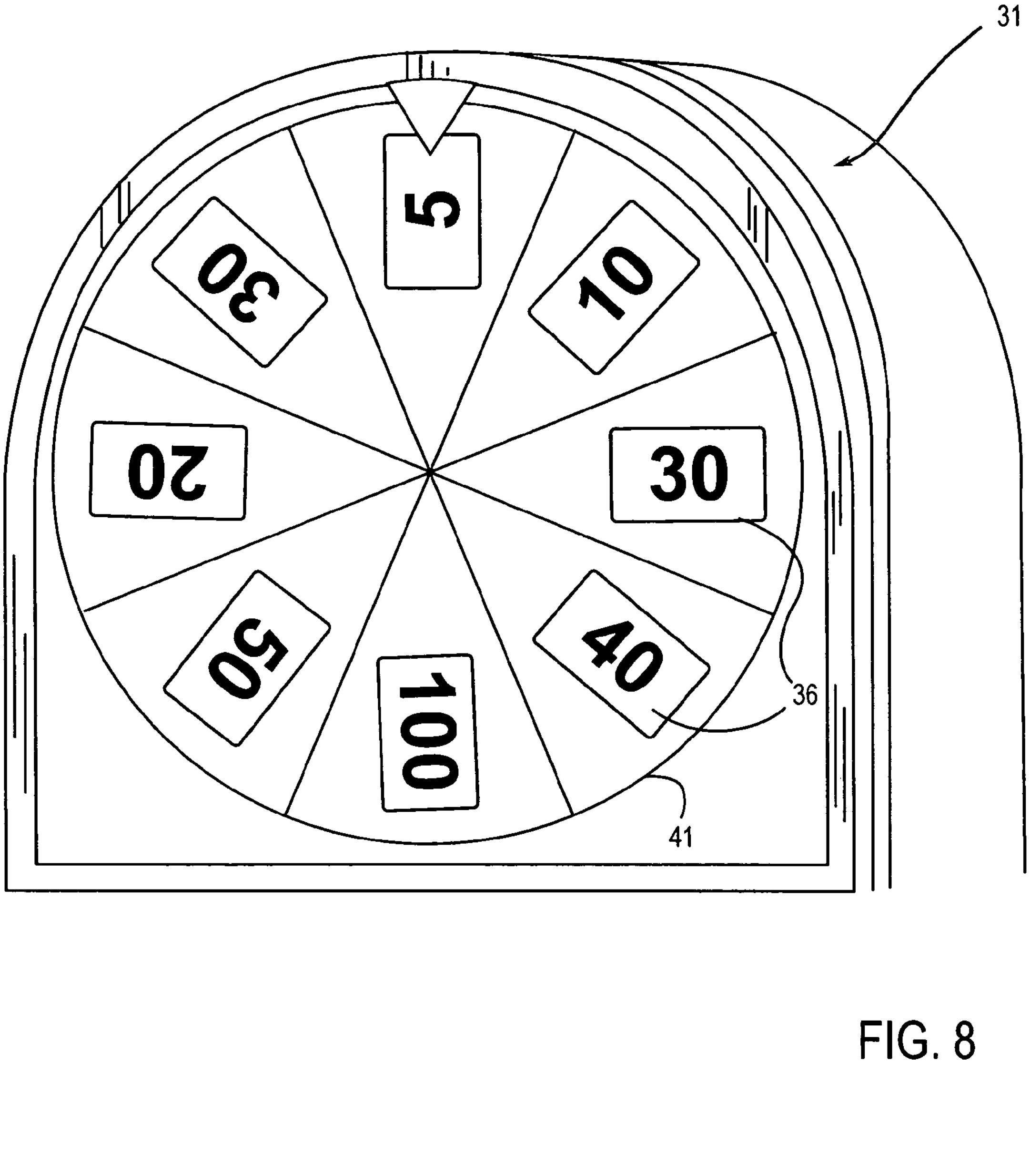
FIG. 8 is the wheel of chance type top box bonus game of FIG. 5 in a second bonus prize orientation.

The same approach can be used with the wheel of chance game shown in FIG. 6. If the 50-credits segment is hit too often, the required payback percentage will be too high, and the game's profitability will suffer. To counterbalance this bias, the 50-credit segment (signified by an LED for example) may be switched with the 5-credit segment shown to create a wheel with reorganized credit awards as shown in FIG. 8. Over time, the 5-credit segment will be hit more frequently that the 50-credit segment, averaging out the game's total return. This cancels the payback percentage bias in the system—although it does nothing to correct the mechanical bias. Through the constant interchanging of payout values, a bias in the payback percentage can be equalized out. Although the example provided above does not change any of the initial payout values available to the player (only their position on the wheel), the payout values on the wheel may also be changed.

Any combination of intentional bias and alteration of the payout value associated with an outcome category can be used to affect the probability distribution. The combination of these two techniques can significantly bias the probability distribution.

In the embodiments described above, the present invention is described in the context of a gaming machine. The invention, however, can also be applied to any wagering game provided it has at least a partially mechanically determined game outcome. For example, many gaming establishments have money wheels on their gaming floor. These money wheels are operated by an attendant who spins the money wheel determine a random outcome. Each sector of the wheel contains a bill or a losing outcome. A stationary pointer determines the winning sector and awards the player the bill associated with that sector. These games are entirely mechanical and consequently subject to mechanical degradation that influences random outcomes produced by these games.

Another example of a wagering game with a mechanically determined outcome is a keno or lottery type game. To provide a more realistic physical display, the present invention can use the traditional lottery ball blower to randomly select individual lottery balls. A running statistical analysis can be maintained for each ball drawn. Based on the statistical analysis, non-random operation can be detected and a corrective intentional bias can be applied to the game.

For example, in one embodiment the lottery ball blower may momentarily trap an individual ball, identify that ball, and if that ball is identified as one that is too frequently hit, the ball is rejected before it is displayed to the player. Alternately, if the ball blower traps an individual ball identified as infrequently picked, that ball may be selected for display to the player.

A variety of statistical methodologies and formulas can be employed to detect biased game systems. Although the traditional Chi-square analysis has been discussed to detect bias and determine when that bias needs to be corrected, any number of other statistical methods may be used or developed to ensure that the required probability distribution is achieved.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting a wagering game on a gaming machine, comprising:

producing a first plurality of game outcomes with a non-electrically driven mechanical selector mechanism associated with the gaming machine, each game outcome having one of a plurality of outcome categories, and each game outcome not being predetermined by an electronic mechanism;

storing the first plurality of game outcomes in a memory;

analyzing the statistical occurrence of game outcomes associated with each of the plurality of outcome categories to identify a first bias;

providing a signal when the first bias is identified; and imposing a countervailing bias with a control mechanism in response to the signal.

2. The method of claim 1, wherein the gaming machine includes a gaming terminal networked to a central server to perform the steps of storing, analyzing, and providing.

3. The method of claim 1, wherein the step of analyzing the statistical occurrence of game outcomes includes determining confidence limits and applying a mathematical test to detect the first bias.

4. The method of claim 3, wherein the mathematical test is a Chi-square test.

5. The method of claim 1, further including shutting down the gaming machine in response to providing the signal.

6. The method of claim 5, wherein the signal identifies a biased outcome category.

7. The method of claim 1, further including storing the time at which each game outcome is selected.

8. The method of claim 7, further including analyzing the occurrence of game outcomes associated with each of the outcome categories with respect to time.

9. The method of claim 1, wherein the countervailing bias is imposed randomly.

10. The method of claim 1, further including:

producing a second plurality of game outcomes with the selector mechanism;

storing the second plurality of game outcomes in the memory;

analyzing the statistical occurrence of the biased game category in the second plurality of game outcomes to identify a second bias; and comparing the first bias and the second bias.

11. The method of claim 10, further including shutting down the gaming machine if the bias is increasing.

12. The method of claim 10, further including increasing the countervailing bias.

13. The method of claim 1, further including:

producing a second plurality of game outcomes with the non-electrically driven selector mechanism;

storing the second plurality of game outcomes in the memory;

analyzing the statistical occurrence of game outcomes in the biased outcome category from the population of both the first and the second plurality of game outcomes to identify bias; and removing the countervailing bias if the biased outcome category is within statistical confidence limits.

14. The method of claim 1, wherein the control mechanism includes an electromagnet that provides an magnetic field to impose the countervailing bias.

15. The method of claim 1 wherein imposing the countervailing bias includes:

identifying a target game outcome probability distribution;

calculating an actual game outcome probability distribution based on the first plurality of game outcomes; and counteracting the first bias to adjust the actual game outcome probability distribution toward the target game outcome probability distribution.

16. A method of conducting a wagering game on a gaming machine, comprising:

producing a first plurality of game outcomes with a non-electrically driven mechanical selector mechanism, each game outcome associated with one of a plurality of outcome categories, each outcome category having a payout value, and each game outcome not being predetermined by an electronic mechanism;

storing the first plurality of game outcomes in a memory;

analyzing the first plurality of game outcomes with a central processing unit to detect a biased outcome category; and changing the payout value of the biased outcome category to offset the effect of the biased outcome category on the payback percentage.

17. The method of claim 16, wherein the gaming machine includes a gaming terminal networked to a central server to perform the steps of producing, storing, and analyzing.

18. The method of claim 16 wherein changing the payout value includes interchanging the payout value of the biased outcome category with another outcome category to offset the effect of the biased outcome category on a payback percentage.

19. A gaming system, comprising:

a wager acceptor for accepting a wager to initiate play of the gaming machine;

a non-electrically driven mechanical selector mechanism for producing a plurality of game outcomes, each game outcome having one of a plurality of outcome categories, and each game outcome not being predetermined by an electronic mechanism;

an output detector to determine the outcome category of each game outcome, the output detector further for transmitting each game outcome to the CPU;

a memory for storing the plurality of game outcomes; and a CPU in communication with the memory, the CPU for performing a statistical analysis of the game outcomes in each of the outcome categories to detect bias, the CPU further for providing a signal if bias is detected.

20. The gaming system of claim 19, further including:

a central server for housing the CPU and memory; and a gaming machine for housing the wager acceptor, non-electrically driven selector mechanism, and output detector, the gaming machine and the central server in communication to determine the plurality of game outcomes.

21. The gaming system of claim 19, wherein the signal identifies a biased outcome category.

22. The gaming system of claim 19, further including a control mechanism for imposing a countervailing bias in response to the signal.

23. The system of claim 22, wherein the control mechanism includes an electromagnet that provides an magnetic field to impose the countervailing bias.

24. The gaming system of claim 22, wherein the countervailing bias is imposed randomly.

25. A method of conducting a wagering game on a gaming machine, comprising:

producing a first plurality of game outcomes with a non-electrically driven mechanical selector mechanism associated with the gaming machine, each game outcome associated with one of a plurality of outcome categories, and each game outcome not being predetermined by an electronic mechanism;

storing the associated outcome category of each of the first plurality of game outcomes in a memory;

analyzing the statistical occurrence of game outcomes associated with each of the plurality of outcome categories to detect bias in the non-electrically driven selector mechanism; and imposing a countervailing bias on the non-electrically driven selector mechanism with a control mechanism.

26. The method of claim 25, further including altering the payout value associated with a game category.

* * * * *

UNITED STATES PATENT AND TRADEMARK OFFICE

CERTIFICATE OF CORRECTION

PATENT NO. : 7,891,664 B2
APPLICATION NO. : 10/840856
DATED : February 22, 2011
INVENTOR(S) : Michael L. White et al.

It is certified that error appears in the above-identified patent and that said Letters Patent is hereby corrected as shown below:

In column 8, line 46, delete “its as” and insert -- its --, therefor.

In column 16, line 61, in Claim 14, delete “an” and insert -- a --, therefor.

In column 18, line 16, in Claim 23, delete “an” and insert -- a --, therefor.

Signed and Sealed this
Twelfth Day of July, 2011

David J. Kappos
*Director of the United States Patent and Trademark Office*